United States Patent [19]
Stouffer

[11] Patent Number: 5,749,525
[45] Date of Patent: May 12, 1998

[54] FLUIDIC WASHER SYSTEMS FOR VEHICLES

[75] Inventor: Ronald D. Stouffer, Silver Spring, Md.

[73] Assignee: Bowles Fluidics Corporation, Columbia, Md.

[21] Appl. No.: 636,765

[22] Filed: Apr. 19, 1996

[51] Int. Cl.$^6$ ............................. F15C 1/08; B05B 1/10
[52] U.S. Cl. ............................. 239/284.1; 137/835
[58] Field of Search ............... 239/284.1, 284.2, 239/101, 499; 137/825, 826

[56] References Cited

U.S. PATENT DOCUMENTS

| | | | |
|---|---|---|---|
| 3,507,275 | 4/1970 | Walker | 239/101 |
| 4,000,757 | 1/1977 | Freeman | 137/836 X |
| 4,052,002 | 10/1977 | Stouffer et al. | 239/101 X |
| 4,645,126 | 2/1987 | Bray | 239/284.1 X |

FOREIGN PATENT DOCUMENTS

| | | | |
|---|---|---|---|
| 81/01966 | 7/1981 | WIPO | 239/284.1 |

Primary Examiner—Kevin Weldon
Attorney, Agent, or Firm—Jim Zegeer, Esq.

[57] ABSTRACT

A vehicle washer nozzle system having a source of washer liquid under pressure, a fluidic oscillator comprising a housing and a fluidic insert having a power nozzle, an oscillation chamber having an upstream end coupled to the power nozzle for issuing a jet of washer liquid into the oscillation chamber and a downstream end having an outlet aperture for issuing a jet of wash liquid to ambient, and side and top and bottom walls, an oscillation inducing silhouette in the oscillation chamber for causing said jet of wash liquid to rhythmically sweep back and forth between the sidewalls in the oscillation chamber. Top and bottom walls of the oscillation chamber first diverge for a predetermined distance in a downstream direction and then converge towards each other through said outlet aperture. This enables the deflection angle to be adjusted for different vehicles and applications by changes to the fluidic insert without changes to the housing.

2 Claims, 3 Drawing Sheets

FIG. 1A (PRIOR ART)
FIG. 1B (PRIOR ART)
FIG. 1C (PRIOR ART)
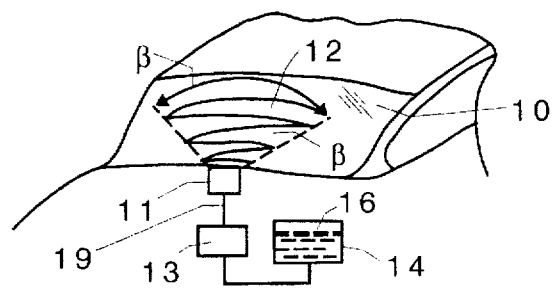
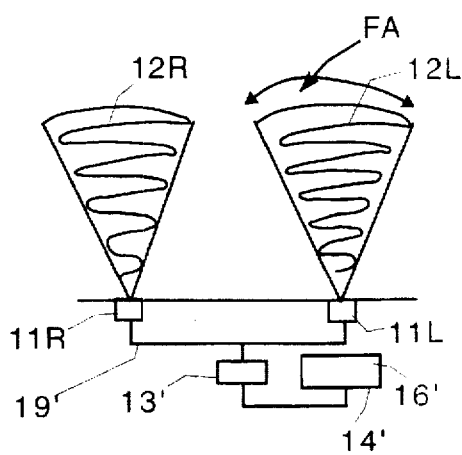
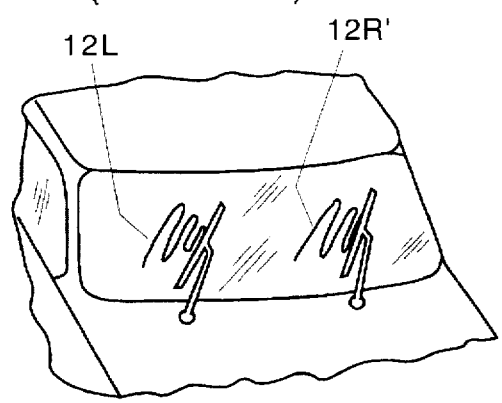
FIG. 2A (PRIOR ART)
FIG. 2B (PRIOR ART)
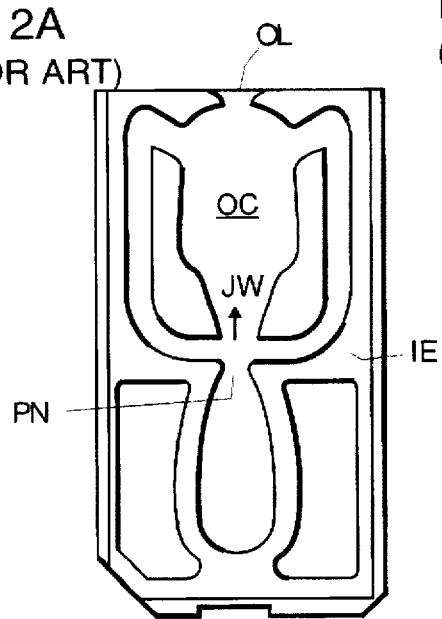
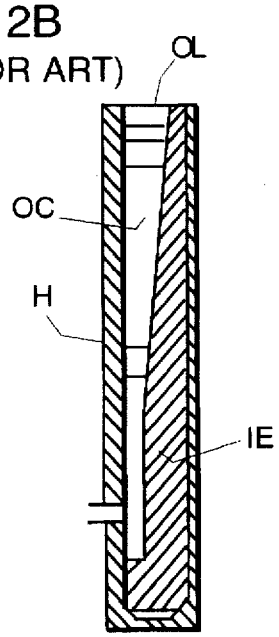

FLUIDIC WASHER SYSTEMS FOR VEHICLES

BACKGROUND AND BRIEF DESCRIPTION OF THE INVENTION

The present invention relates to fluidic oscillators for use in vehicle washer systems and more particularly to a fluidic oscillator for vehicle windshield washer systems in which a housing, which can be commonly used on different vehicles, incorporates a fluidic oscillator element, hereinafter termed a "fluidic insert", which carries a physical silhouette or pattern of a fluidic oscillator and is adapted to create different deflection angles. As used herein, the term "deflection angle" means the angle that the jet of wash liquid makes as it exits the outlet in a plane orthogonal to the plane of the silhouette, and the term "fan angle" is the angle made by the jet sweeping back and forth between the boundaries of the outlet in the plane of the silhouette.

Stouffer U.S. Pat. No. 4,508,267 entitled LIQUID OSCILLATOR DEVICE and Bray, Jr. U.S. Pat. No. 4,463,904 entitled COLD WEATHER FLUIDIC FAN SPRAY DEVICES AND METHOD disclose fluidic oscillators which have proved to be highly successful. They typically comprise a housing in which a fluidic insert element having a silhouette of a fluidic oscillator is inserted into the housing. The silhouette of the fluidic oscillator typically is of the type disclosed in FIGS. 2A and 2B, FIG. 2A being from the aforementioned Stouffer U.S. Pat. No. 4,508,267 and FIG. 2B being Bray, Jr. U.S. Pat. No. 4,463,904, it being appreciated that other forms of fluidic oscillators may be used. This type of fluidic oscillator has a power nozzle PN issuing a jet of windshield washer liquid JW into an oscillation chamber OC towards an outlet OL which issues the jet of wash liquid into ambient where it is oscillated in a fashion so as to cause it to rhythmically be swept back and forth so as to cause the liquid jet to break up in droplets of predetermined size configuration or range so as to impinge on the windshield at a predetermined position under various driving conditions as disclosed in U.S. Pat. No. 4,157,161. In the Bray, Jr. patent, the Coanda effect wall attachment or lock-on cause a dwell at the ends of the sweep which tends to make the spray heavier at the ends of the sweep than in the middle. In the Stouffer U.S. Pat. No. 4,508,267, the configuration of the silhouette is such as to cause the liquid oscillator issue a swept set fan spray in which the liquid droplets were relatively uniform throughout the fan spray and the uniform droplets provide a better cleaning action.

In the manufacture of windshield washer nozzles, it has been found desirable to provide one housing on different vehicles which thereby reduces the cost of housing design and the tools. However, this requires creating different deflection angles in the fluidic inserts which contains fluidic oscillating element per se.

It has been found desirable to provide variable deflection angles. In one approach disclosed in FIGS. 2A and 2B, a fluidic oscillator of the type disclosed in the aforementioned Stouffer U.S. Pat. No. 4,508,267 incorporated a step or bump B at the outlet OL of the fluidic circuit to create up to about a 6° deflection angle oscillator. The step appears to deteriorate fluidic functions and create adverse side effects such as:

1. Inconsistent and unreliable deflection angles due to the high sensitivity of the flow to the step height,
2. Reduced fan angles and flow rates because the step or bump could reduce the throat area,
3. Smaller than normal droplets caused by the fluid impact on the step or bump,
4. Messy spray caused by fluid impact on the step or bump,
5. Degraded waves as a direct result of the destruction of fluid functions made by the step.

Moreover, the deflection angles of the fluidic washer nozzles can be adjusted by using the taper at the floor of the fluidic insert as disclosed in the aforementioned Bray, Jr. U.S. Pat. No. 4,463,904. This eliminates the impact between the fluid and the step. Therefore, the spray is usually not as messy, and the wave is usually not degraded until the taper reaches about 10° to 12° when the flow begins to separate from the floor of the insert. The deflection angles are not as sensitive to the taper as it is to the step. However, with the use of a large taper, the spray becomes much thicker, and it makes the reading of the deflection angle very difficult and inconsistent because it is hard to find the center of a thick spray.

According to the present invention, the problem discussed above is solved by the use of a reverse taper at the outlet of the fluidic insert to adjust the deflection angles of the fluidic wash nozzle. This reverse type allows one housing to be used for several different types of vehicles which have different requirements for deflection angles. It allows the creating of different deflection angles in the fluidic insert per se rather than designing a housing and tools for the different deflection angles desired. Thus, according to the present invention, the windshield washer element has a housing with a rectangular chamber having formed therein a silhouette or physical pattern of a fluidic oscillator which may be of the type disclosed in the above-referenced patents. The fluidic oscillator silhouette has an oscillation chamber having an upstream end coupled to the power nozzle for issuing a jet of wash liquid into the oscillation chamber and a downstream end having an outlet aperture perforation for issuing wash liquid to ambient. The oscillation chamber includes means for causing the jet of wash fluid to rhythmically sweep back and forth between the side walls and the oscillation chamber and issue in a sweeping rhythmic fashion and through the outlet. According to the invention, the top and bottom walls of the oscillation chamber diverge for a predetermined distance in a downstream direction and then converge towards each other through the outlet aperture. For different housings, and different physical applications, the degree of the taper can be changed to accommodate the deflection angles required by different vehicles, to thereby reduce the cost of housing design and the tools.

The invention retains the droplet size without causing a detrimental increase in smaller droplets which are more adversely affected by wind and air flow effects over the vehicle. One of the basic objectives of the fluidic windshield washer nozzle is to have a fan spray which has a designed or predetermined droplet distribution through the fan and the present invention retains desired droplet distribution while providing the uniform droplet distribution of Stouffer U.S. Pat. No. 4,508,267.

DESCRIPTION OF THE DRAWINGS

The above and other objects, advantages and features of the invention become more apparent when considered with the following specification and accompanying drawings wherein:

FIG. 1A is a diagrammatic sketch of an automobile windshield washer system to which the invention has been applied;

FIG. 1B is a diagrammatic sketch of an automobile windshield washer system wherein there is a dual fan, one for the driver side and one for the passenger side;

FIG. 1C is a diagrammatic illustration of a "wet arm" windshield washer system wherein the nozzles are mounted on the arms of the wiper blades;

FIG. 2A is a top plan view of a silhouette of a power fluidic oscillator as disclosed in Bray, Jr. U.S. Pat. Nos. 4,463,904 and 4,645,126; and FIG. 2B is a sectional view of the fluidic oscillator shown in FIG. 2A as inserted in a rectangular housing;

DETAILED DESCRIPTION OF THE INVENTION

Figures 3A, 3B:
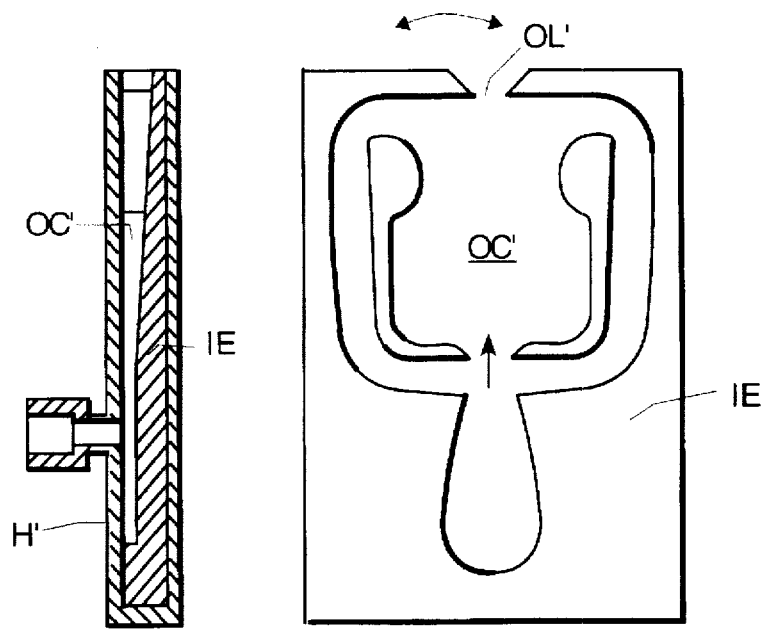
FIG. 3A is a top silhouette of a fluidic oscillator as disclosed in Stouffer U.S. Pat. No. 4,508,267.
FIG. 3B is a sectional view through a centerline thereof.

FIGS. 1A, 1B and 1C depict vehicle windshields with different techniques utilized in the art for mounting the windshield washer nozzles for applying a fan spray of washer fluid droplets to the windshield glass surface to be cleaned. It will be appreciated that while the invention has been illustrated as applied to the windshield of the vehicle, it can be applied to the tailgate window glass or to glass headlamp washers, the principal use being for windshield glass. As shown in FIG. 1, vehicle windshield 10 is provided with a single fan spray device 11 which issues a fan spray 12 of proper droplet size and sweep frequency. Wash liquid for spray 12 is provided by pump 13 from reservoir 14 which would conventionally be under the hood of the vehicle. Windshield wash liquid 16 is contained in reservoir 14. In FIG. 1B, a pair of fluidic oscillator nozzles 11R and 11L, one for the passenger's side and one for the driver's side of the vehicle are provided for issuing fan sprays 12R and 12L from the windshield for the respective driver and passenger sides of the vehicle. In FIG. 1A, a fluid oscillator of the type shown in FIG. 2 which is a heavy ended, and this is due principally to Coanda wall attachment effects, so the sides of the spray are heavier or more concentrated in wash fluid droplets than the center of the spray so as to provide equal amounts of wash fluid for distribution on the driver and the passenger sides.

In the embodiment shown in FIG. 1B, fluidic oscillators of the type shown in FIG. 3 are preferred since these provide relatively uniform droplet distributions throughout the fan spray. FIG. 1C illustrates a "wet arm" embodiment wherein the nozzles are mounted on the wiper arm while FIG. 1C illustrates the spray as being to the left of the wiper arm having its position shown, it will be appreciated that various combinations can be utilized when spraying either from the left or the right of the wiper arm depending on design considerations. Either type of fluidic oscillator may be used in this embodiment.

As described in the above referenced Bray, Jr. U.S. Pat. Nos. 4,463,904 and 4,645,126 and Stouffer U.S. Pat. No. 4,508,267, a system of vortices is established in the oscillation chamber of the respective oscillators. Each of the oscillators causes a jet of wash fluid to be issued through the outlet to ambient, which jet is oscillated or swept back and forth in a fan angle β and which varies from about 30° to about 160° as set forth in Stouffer U.S. Pat. No. 4,508,267.

In the aforementioned Bray, Jr. patents and also in the Stouffer patent, the upper (roof) or lower walls or both of the fluidic oscillator have a taper incorporated therein so that the walls diverge from each other in the direction of the outlet OL so as to expand the power jet in cold weather, a typical taper or angle being about 5°. In the aforementioned Bray, Jr. patents, the taper is within a range of 2° and about 10° with 5° being found to be most acceptable since the taper angle is a function of the distance between a power nozzle and the fluid outlet.

Figures 4A, 4B:
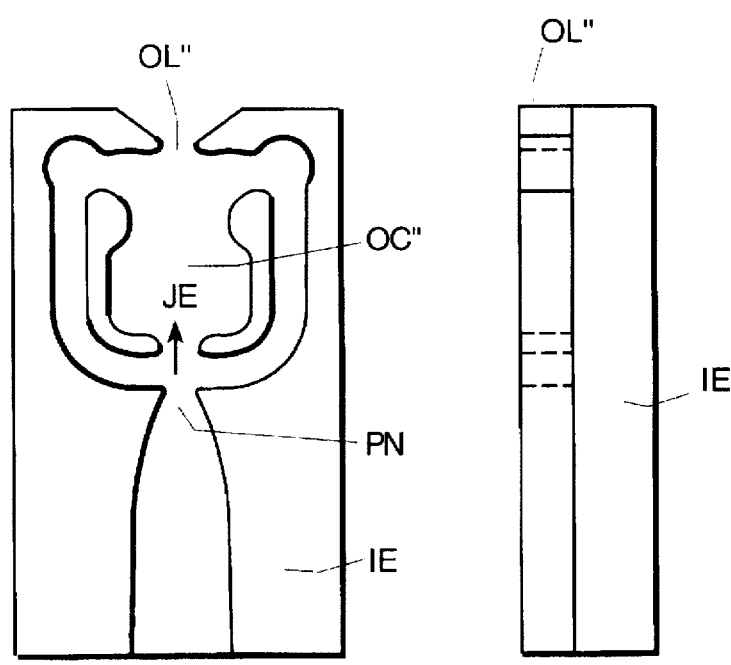
FIG. 4A is a silhouette of a fluidic oscillator element having the bump in the nozzle, outlet aperture.
FIG. 4B is a sectional view thereof through a power nozzle and outlet aperture.

In the nozzle construction shown in FIGS. 4A and 4B, a step or bump 30 is provided at the outlet OL of the fluidic circuit to create up to about 6° deflection angle. However, such a step deteriorates fluidic function and creates the following undesirable side affects:

1. Inconsistent and unreliable deflection angles due to the high sensitivity of the flow to the step height.
2. Reduced fan angles and slow rates because the step reduces the throat area.
3. Smaller than normal droplets caused by the fluid impact on the step.
4. Messier spray caused by the fluid impact on the step; and
5. Degraded waves as a direct result of the fluidic functions made by the step.

The deflection angles of the fluidic oscillator can be adjusted by using the taper as shown in the Bray, Jr. and Stouffer patents. This eliminates the impact between the fluid and the step, and therefore the spray is not as messy and the wave is usually not degraded until the taper reaches about 10°14 12° when the flow begins to separate from the floor of the insert. The deflection angle is not as sensitive to the taper as the step. However, with the use of a large taper the spray comes much thicker making it difficult and inconsistent to find the center of a thick spray.

THE PRESENT INVENTION

Figure 5A:
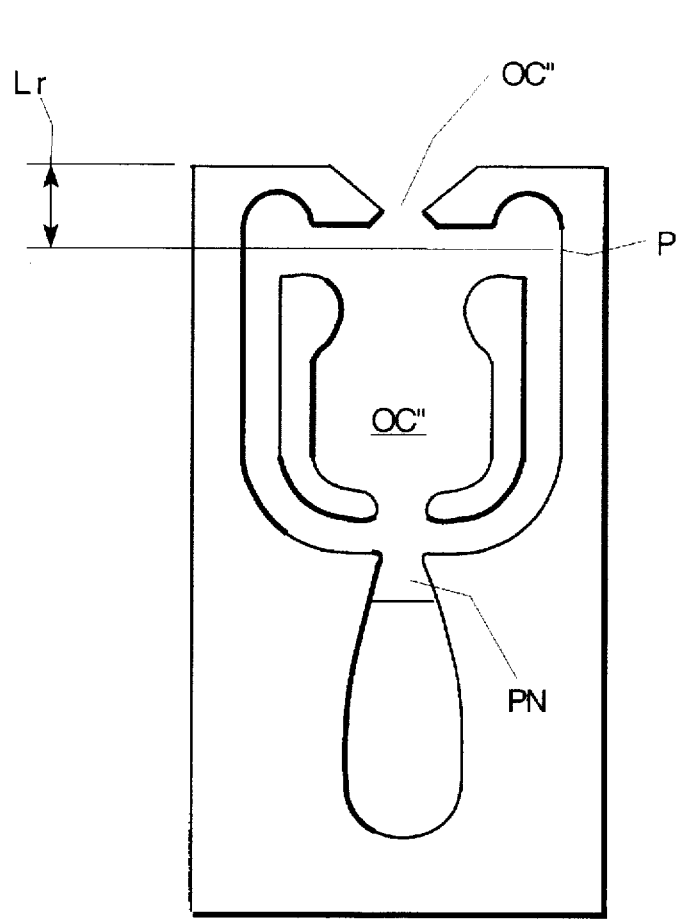
FIG. 5A is a top plan view of a silhouette of a fluidic oscillator incorporating the present invention.
Figure 5B:
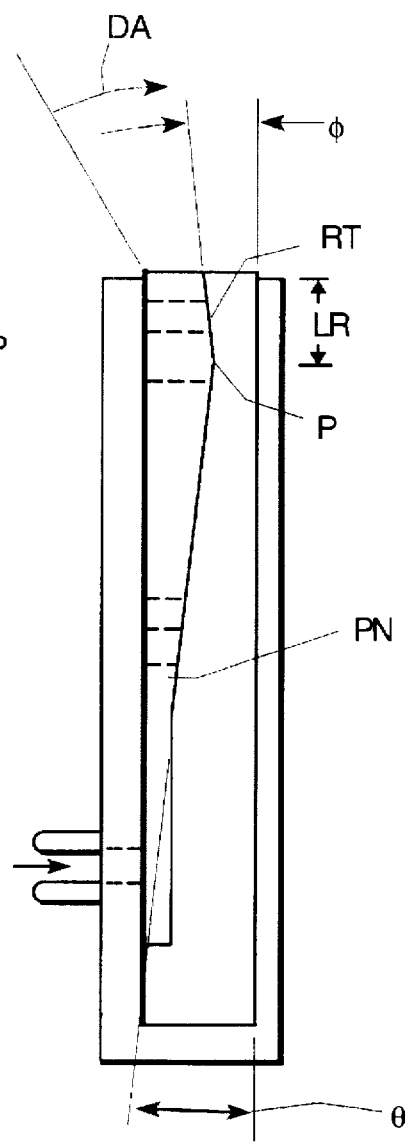
FIG. 5B is a sectional view through lines BB of FIG. 5A.

In order to create the required deflection angle without the above problems, the fluidic oscillator of the present invention solves this problem by use of a reverse taper at the outlet of the fluidic insert to adjust the deflection angles of the fluidic washer nozzles. These are shown in FIGS. 5A and 5B.

The most critical parameter of the reverse taper insert is its deflection angle, although other performance factors (such as fan angle, flow rate, spray thickness, wave pattern, fluid droplet size and spray cleanliness) are important as well. By adding the reverse taper RT, at angle φ the thickness of the spray can be reduced which makes the deflection angles more consistent and reliable and as a result, of the thinner spray, fluid is more concentrated in the middle which aids in the dynamic performance of the fluidic windshield washer nozzle. Moreover, the reverse taper does not create as much destruction of the spray as the step at the outlet of the insert. This makes the spray cleaner and not as degraded as in the case of the step at the outlet (FIGS. 4A and 4B). In fact, the droplet sizes are also larger which is good for high speed testing since the high speed wind affects on small droplets is significant. In most cases, the throat depth and throat area are unchanged by adjusting the taper after the reverse taper is added to the insert. Therefore, the fan angle does not have to be reduced by the addition of reverse taper.

In a preferred embodiment, the diverging taper from the power nozzle PW to the point where the converging or reverse taper begin is about 5° and the reverse taper angles φ is about 3°. By making various combinations of changes in this angle in the fluidic insert, the deflection angle DA can be adjusted without making any changes in the housing. The length Lr of the reverse taper can also be adjusted.

While the invention has been described and illustrated with respect to specific embodiments, it will be clear that various modifications and adaptations and changes to the invention will be obvious to those skilled in the art without departing from the true spirit and scope of the invention as set forth in the appended claims.

What is claimed is:

1. In a vehicle washer nozzle system having a source of washer fluid under pressure, a fluidic oscillator having a power nozzle, an oscillation chamber having an upstream end coupled to said power nozzle for issuing a jet of washer liquid into said oscillation chamber and a downstream end having an outlet aperture for issuing a jet of wash fluid to ambient, and side and top and bottom walls, an oscillation inducing means in said oscillation chamber for causing said jet of wash fluid to rhythmically sweep back and forth between said sidewalls and said oscillation chamber, the improvement wherein said top and bottom walls first gradually diverge for predetermined distance in a downstream direction and then gradually converge towards each other through said outlet aperture.

2. A vehicle windshield washer system defined in claim 1 wherein said walls diverge at about a 5° angle and said walls begin to converge towards each other at a position in advance of said outlet aperture.

* * * * *